(12) United States Patent
Holmes

(10) Patent No.: US 10,471,977 B1
(45) Date of Patent: Nov. 12, 2019

(54) PATH DISRUPTION ALERT VEHICLE SYSTEM AND METHOD

(71) Applicant: Martin Daniel Holmes, Willcox, AZ (US)

(72) Inventor: Martin Daniel Holmes, Willcox, AZ (US)

(*) Notice: Subject to any disclaimer, the term of this patent is extended or adjusted under 35 U.S.C. 154(b) by 0 days.

(21) Appl. No.: 16/408,238

(22) Filed: May 9, 2019

Related U.S. Application Data

(63) Continuation-in-part of application No. 15/684,701, filed on Aug. 23, 2017, now abandoned.

(51) Int. Cl.
*B61L 23/04* (2006.01)
*G01S 13/93* (2006.01)
*B61L 23/34* (2006.01)

(52) U.S. Cl.
CPC ............ *B61L 23/041* (2013.01); *B61L 23/34* (2013.01); *G01S 13/931* (2013.01); *G01S 2013/9328* (2013.01)

(58) Field of Classification Search
CPC ...... B61L 23/041; B61L 23/34; G01S 13/931; G01S 2013/9328
See application file for complete search history.

(56) References Cited

U.S. PATENT DOCUMENTS

| | | | | |
|---|---|---|---|---|
| 5,429,329 A | * | 7/1995 | Wallace | B61L 23/041 246/121 |
| 5,623,244 A | * | 4/1997 | Cooper | B61L 23/041 246/166 |
| 5,627,508 A | * | 5/1997 | Cooper | B61L 23/041 246/166.1 |
| 5,786,750 A | * | 7/1998 | Cooper | B61L 23/044 246/121 |
| 2014/0229096 A1 | * | 8/2014 | Carlson | B61L 15/0027 701/301 |
| 2017/0015336 A1 | * | 1/2017 | Bartek | B61L 23/06 |

* cited by examiner

*Primary Examiner* — Rodney A Butler
(74) *Attorney, Agent, or Firm* — Venjuris P.C.; Michael Campillo

(57) ABSTRACT

A path disruption alert vehicle system that positions an alert vehicle forward of an ensuing vehicle, alerts the ensuing vehicle of sensed path disruption events, and alerts individuals that are in the path of the oncoming ensuing vehicle.

17 Claims, 5 Drawing Sheets

PATH DISRUPTION ALERT VEHICLE SYSTEM AND METHOD

CROSS-REFERENCE TO RELATED APPLICATIONS

This application is a continuation in part of application Ser. No. 15/684,701 filed on Aug. 23, 2017, which claims benefit of U.S. Provisional App. Ser. No. 62/384,582, filed on Sep. 7, 2016.

FIELD OF THE INVENTION

The present invention relates to safety related devices and methods to prevent rail mounted vehicles from derailing or striking objects blocking the path of the vehicles.

SUMMARY OF THE INVENTION

The path disruption alert vehicle system may be embodied by a system comprised of components and processes including a path disruption alert vehicle. The alert vehicle may include a path disruption sensor configured to sense path disruptions in the forward path of the alert vehicle, a position determination device configured to determine its or an ensuing vehicle, a first wireless communications device, and a processor operatively coupled to and controlling the alert vehicle motor and brake system, the alert vehicle operating at least one process to detect path disruptions and transmit a path disruption alert from the first wireless communications device, the processor also operating a process to control the alert vehicle motor control and brake system to cause the alert vehicle to maintain a position forward of the ensuing vehicle that is at least as much as an ensuing vehicle stopping distance. In path disruption alert vehicle system systems, the first wireless communications device will communicate with at least a second wireless communications device located at the ensuing vehicle (or otherwise remote from the alert vehicle), which receives the path disruption alert.

Aspects of the invention include embodiments wherein the path disruption sensor is implemented with radar and a radar processing system or alternately implemented with video and video processing system. Aspects also include embodiments wherein the position determination device is implemented with a radar and radar processing or alternately implemented with a video and video processing system.

Numerous other advantages and features of the present invention will become readily apparent from the following detailed description of the invention and the embodiments thereof, from the claims and from the accompanying drawings.

Figure 1:
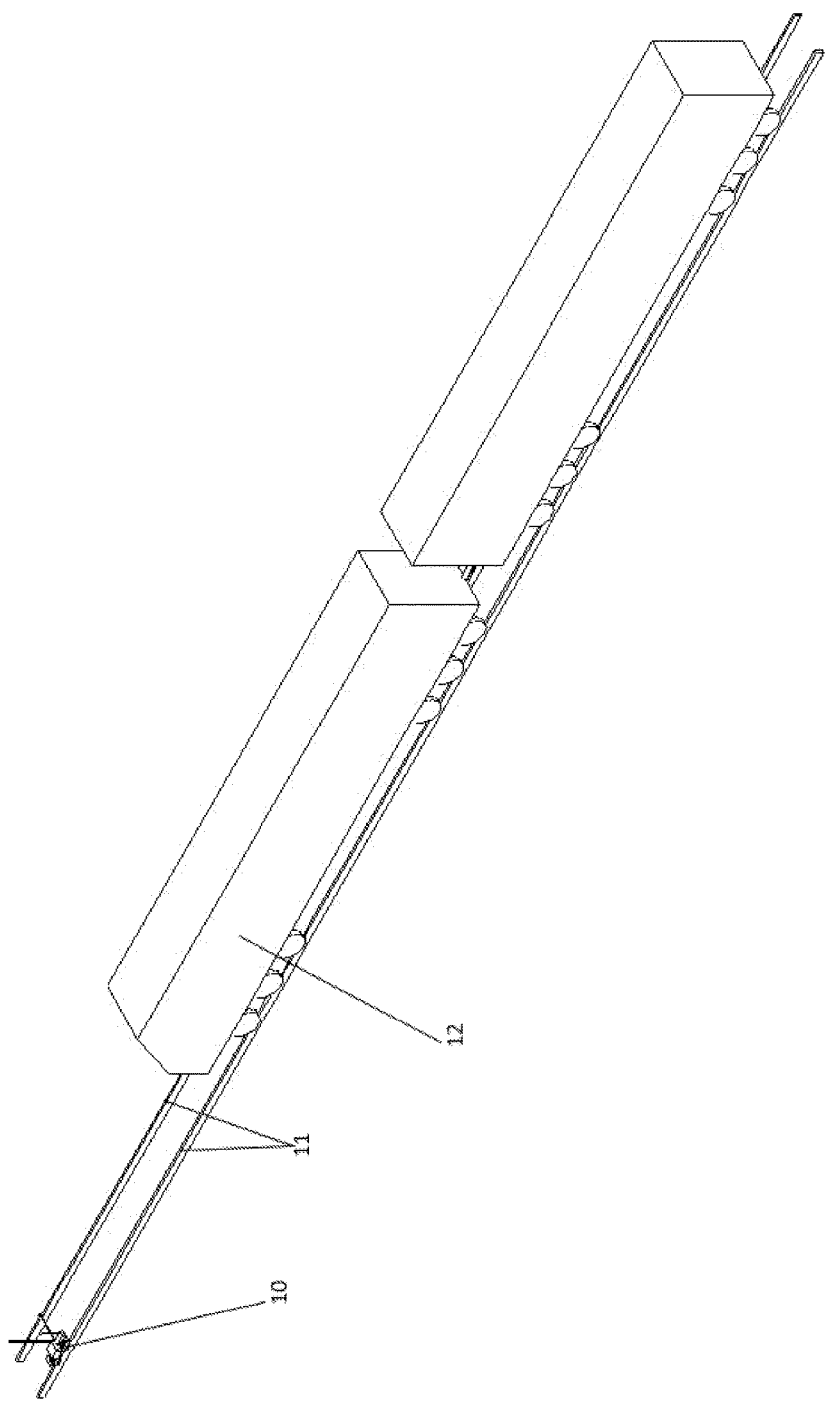
FIG. 1 illustrates a path disruption alert vehicle system employed in a rail mounted vehicle such as a train or locomotive application wherein the ensuing vehicle 12 comprises a train traveling on a train track 11 and the alert vehicle 10 comprises an autonomous vehicle that travels the train track 11 in front of the ensuing vehicle 12 at a distance (not to scale) minimally comprising the distance required for the ensuing vehicle 12 to stop.

The objects, features and advantages of the present invention will be more readily appreciated upon reference to the following disclosure when considered in conjunction with the accompanying drawings, wherein reference numerals are used to identify the components in the various views.

DESCRIPTION OF PREFERRED EMBODIMENTS

The figures illustrate an embodiment of a path disruption alert vehicle system according to the description and claims that follow. The path disruption alert system will detect path disruption objects, conditions, or events, and alert the ensuing vehicle 12 allowing an individual or system controlling the ensuing vehicle 12 to take action (such as applying the brakes) to avoid contact with the path obstruction, possible derailment, damage to the ensuing vehicle 12 or its contents, and the surrounding environment. Moreover, whereas the figures and written specification describe a particular system architecture, it is contemplated that a person of ordinary skill may modify the teachings herein to construct a path disruption alert system with an alternate system architecture. It follows that features described in preferred embodiments are not intended to limit the scope of the invention beyond what is expressly identified in the claims. Aspects of the system may be embodied in a path disruption alert system for a train or locomotive progressing on a train track as illustrated in FIGS. 1 and 2. A rail mounted vehicle such as a train or locomotive comprises the ensuing vehicle 12 and an autonomous alert vehicle 10 as illustrated in FIG. 2 travels the track ahead of the train and maintains position on the track ahead of the train/ensuing vehicle 12, and communicates a warning or alert in the event of a train track path disruption. Early warning of a physical object or missing track or other path disruption allows the train operator or autonomous train controls to stop the train before reaching the path obstruction or disruption.

Figure 2A:
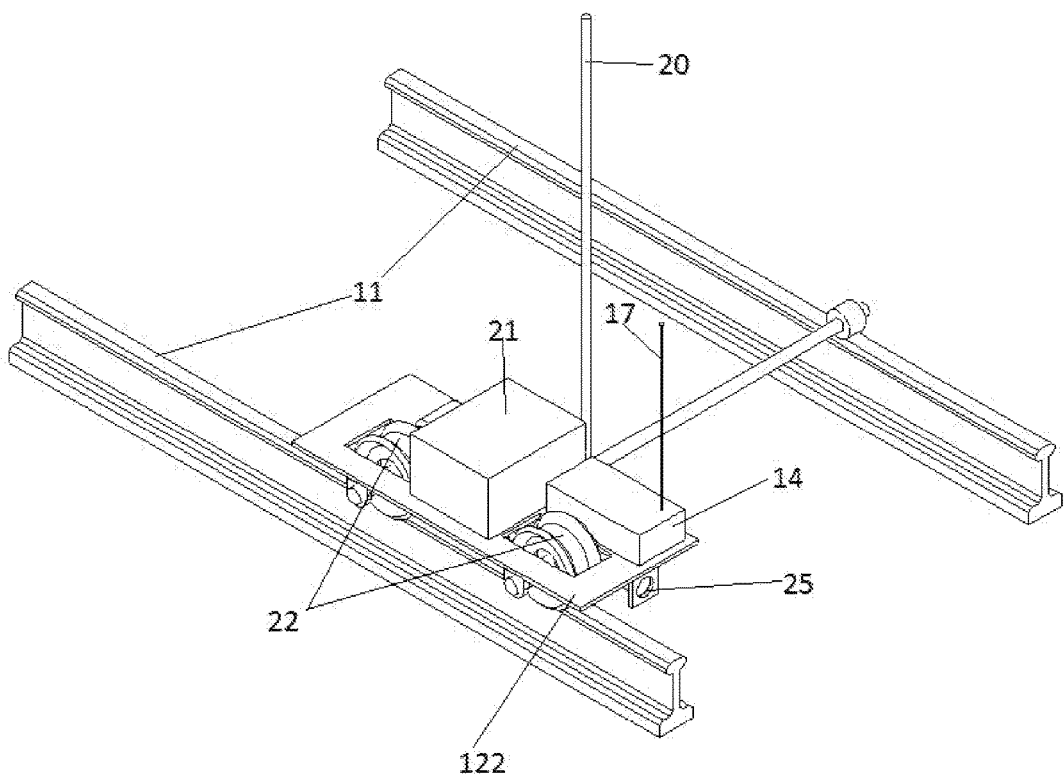
FIG. 2A illustrates a first alert vehicle 10 embodiment compatible with the path disruption alert vehicle system and one possible positioning of the path disruption device 23 and its associated antenna 20 on the alert vehicle 10.
Figure 2B:
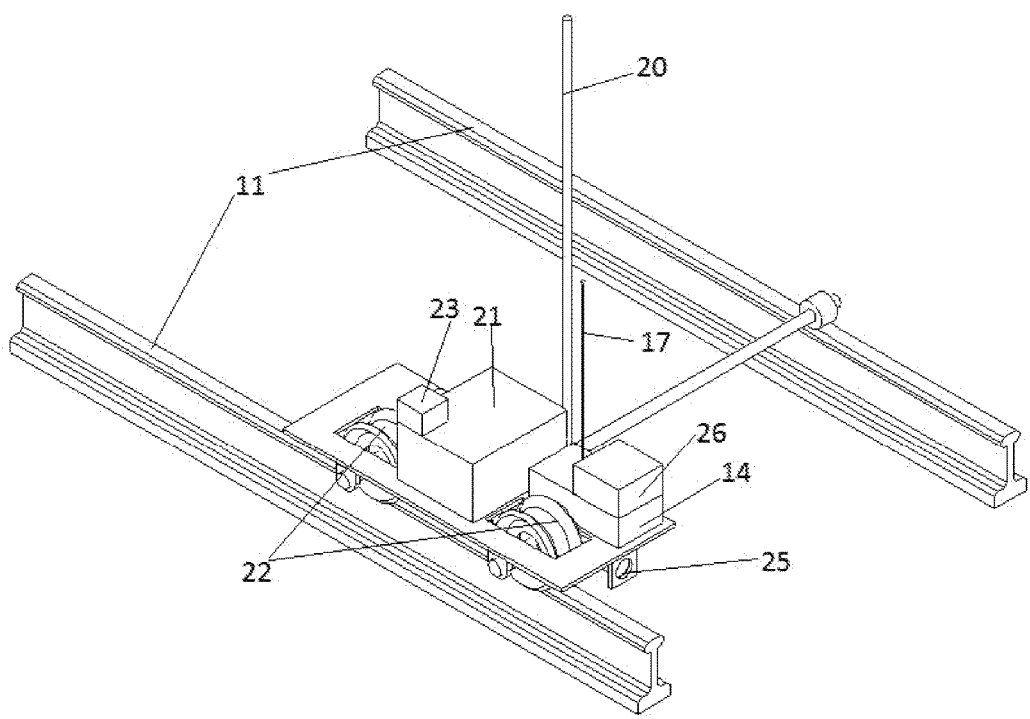
FIG. 2B illustrates a second alert vehicle 10 embodiment compatible with the path disruption alert vehicle system and a second possible positioning or orientation of the path disruption device 23 and its associated antenna 20 on the alert vehicle 10.

FIGS. 2A and 2B illustrate variations of a preferred autonomous path disruption alert vehicle 10. The alert vehicle 10 includes components particular to an alert vehicle 10 compatible with the path disruption alert vehicle system. Common autonomous vehicle components include a chassis 122, a power supply 21, a motor with a motor control 124 (FIG. 3), and a brake system 126 (FIG. 3), rail wheels 22 and a transmission (not shown). Components that are particular to an alert vehicle 10 compatible with the path disruption alert vehicle system include a forward path sensor 23, an alert vehicle 10 position determination device 26, and a first wireless communications devices 14 with antenna 17 to communicate with a second communications device 15 located remotely from the alert vehicle 10.

In the preferred embodiment, the second wireless communications device 15 is located on or at the ensuing vehicle 12. In operation, the path disruption sensor 23 will sense path obstruction objects, conditions, or events for the and the position determination device 26 will determine the alert vehicle 10 position—absolutely or relative to the ensuing vehicle 12—and the path disruption alert vehicle system processes will ensure that the alert vehicle 10 is positioned far enough ahead of the ensuing vehicle 12 so that a warning or path disruption detected by the alert vehicle 10 and transmitted to the ensuing vehicle 12 provides sufficient time to enable the ensuing vehicle 12 to stop before reaching the path obstruction that gave rise to the warning. Alternatively, the second wireless communications device 15 may be statically located remotely from both the path disruption alert vehicle 10 and the ensuing vehicle 12, such as at a central train yard or other dispatching office. And, the system may incorporate yet further communications devices and it should be apparent that any variety of communications technologies may be implemented in the system. Accordingly, the first and second wireless communications devices, 14 and 15, may be dedicated single purpose wireless microwave or radio frequency transmitters and receivers, and transceivers, or the communications devices may each comprise smartphones or other devices that include, or that can be equipped to include a suitable or equivalent wireless communications technology.

The path disruption sensor 23 will sense, monitor, and/or record video of the forward path of the alert vehicle 10 and includes a path disruption output 272. In certain embodiments the path disruption sensor 23 is passive and merely relays radar or video taken from the perspective of the alert vehicle 10. In such embodiments, the radar or video output may comprise the path disruption output 272. For example, the path disruption sensor 23 and path disruption output 272 may comprise a video camera and video output, respectively, which video output may be sent by a first wireless communications device 14 with antenna 17 (e.g. radio frequency or microwave frequency transmission) on the alert vehicle 10 to a second wireless communications device 15 (e.g. radio or microwave frequency receiver) on the ensuing vehicle 12 for display on a terminal that can be monitored by an operator of the ensuing vehicle 12. Upon the operator's detection of a path disruption object, the operator can take action to stop the ensuing vehicle 12.

In other embodiments the, path disruption sensor 23 is active and comprises a radar device or video processing subsystem wherein the path disruption output 272 comprises an analog or digital signal with value depending on the presence or absence of a path disruption. For example, the path disruption sensor 23 may comprise a radar device such as a commercially available radar sensor, such as a RR30.DAM0-IGPB.9VF movement detection sensor Baumer®, or an equivalent or superior sensor. In another example, the path disruption sensor 23 may comprise a video camera with video processing hardware and software that will detect disruptions in the forward path of the alert vehicle 10 and cause the path disruption output 272 to produce at least one analog or digital signal output that may be used by other system components as a path obstruction alert signal. For example, the path disruption output 272 may be a digital or analog level output from a collision alert radar sensor or equivalent, or a digital or analog output from a video camera and video processing system or equivalent, which output may be processed at the alert vehicle 10 or wirelessly communicated to the ensuing vehicle 12 where path disruption alert vehicle system components receive the path disruption output 272 and detect and act on path disruption alerts to alert the ensuing vehicle 12 operator.

In the preferred embodiment (illustrated by FIG. 3), the path disruption output 272 is interpreted by path disruption alert vehicle system components located at the alert vehicle 10. In such embodiment, the path disruption output 272 may be an analog or digital output signal from a radar or video processing subsystem which is coupled to a processor 301 input capable of receiving the input and interpreting the signal level to determine the presence or absence of a path disruption. Accordingly, the path disruption sensor 23 may comprise a radar device or subsystem mounted on the chassis 122 with a radar antenna 20 positioned on a forward or front portion of the chassis 122 and oriented to generate radar waves toward the forward path of the alert vehicle. Accordingly, the radar unit or subsystem may be one or more headway sensors or collision avoidance sensors, or a combination of one or more of said sensors, with a digital or analog output which output may comprise the path disruption output 272 to generate an electrical output signal indicating the presence of a path disruption object in front of the alert vehicle 10. Alternately, the path sensor may comprise a video camera and video processing system with video processing analytics to detect objects captured by the camera. As one example, the video camera and video processing system may comprise a commercially available system such as the FLIR VIP-HD from FLIR®, which comprises a video image processing system that a processes video input stream from a video camera to detect and alert upon detection of objects in the camera video.

The goal or objective of preventing collisions of the ensuing vehicle 12 with objects in its path requires that the path disruption alert vehicle system be capable of providing the ensuing vehicle 12 sufficient forewarning to enable the ensuing vehicle 12 operator or control system to react. The path disruption alert vehicle system accomplishes this object by positioning the alert vehicle 10 on the path ahead of the ensuing vehicle 12 and at least as far ahead as the distance required for the ensuing vehicle 12 to stop.

Figure 3:
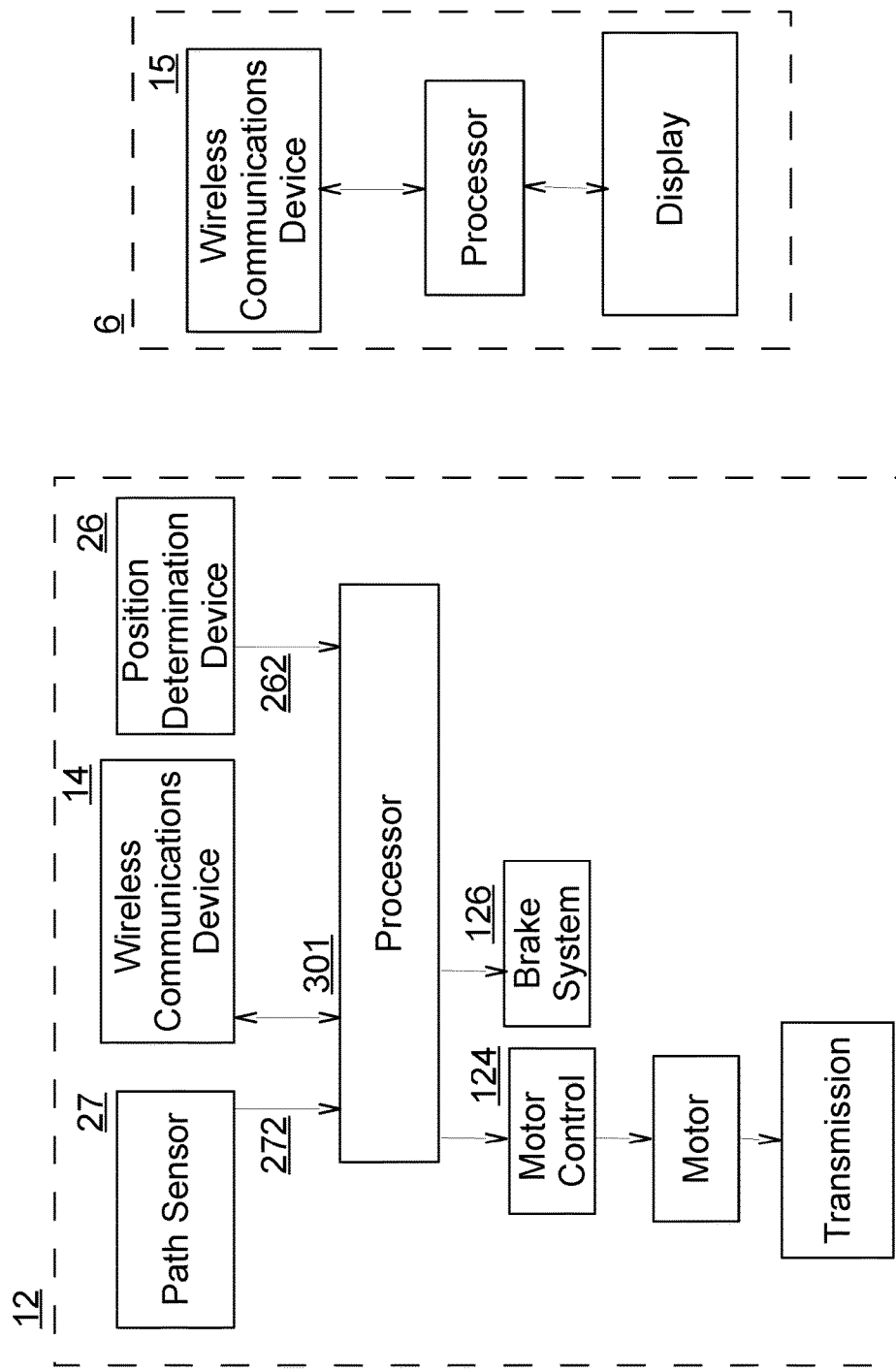
FIG. 3 illustrates a block diagram of a path disruption alert vehicle system according to the description.

The position determination device 26 enables the path disruption alert vehicle system to accurately determine the position of the alert vehicle 10 relative to the ensuing vehicle 12, which allows the path disruption alert vehicle system to control the alert vehicle 10 motor control 124 and brake system 126 and position the alert vehicle 10 at a sufficient distance forward of the ensuing vehicle 12. FIG. 3 illustrates a block diagram for an alert vehicle 10 system architecture meeting this goal. The illustrated embodiment comprises a processor 301 that is electrically coupled to the motor control 124, the brake system 126, and an output of a position determination device 26. Moreover, the processor 301 operates at least one alert vehicle 10 software process to detect path disruption events and control the alert vehicle 10 position relative to the ensuing vehicle 12. The alert vehicle 10 process (or processes) is (are) designed to cause the processor 301 to communicate a path disruption event to the ensuing vehicle 12 (as described above), and also to operate the motor control 124 and brake system 126 so that the ensuing vehicle 12 maintains a position forward of the ensuing vehicle 12 that is at least as much as the ensuing vehicle 12 stopping distance as described below.

The system controls the motor and brakes of the path disruption alert vehicle 10 to control the position of the path disruption alert vehicle 10 relative to the ensuing vehicle 12. Embodiments of the system incorporate at least one position determination device 26 that can be used to determine the position of the path disruption alert vehicle 10 and maintain its position forward of the ensuing vehicle 12 and at a minimum distance equivalent to the ensuing vehicle 12 stopping distance. In a first preferred embodiment, the position determination device 26 may comprise a rearward facing radar unit with a digital or analog output that may be used to generate an electrical output signal indicating the absence of the ensuing vehicle 12 detected by the sensor. The position determination device 26 may alternately comprise a first Global Positioning Satellite (GPS) receiver positioned on the alert vehicle 10 that generates a position data output that may be coupled to the processor 301 and used by the at least one alert vehicle process 1200 to determine the instantaneous approximate position of the alert vehicle 10. Moreover, the ensuing vehicle 12 may be equipped with a second GPS receiver which is used to determine instantaneous approximate position of the ensuing vehicle 12, which instantaneous approximate positions of the alert vehicle 10 and the ensuing vehicle 12 may then be used to calculate or determine the Vehicle Relative Distance (i.e. the distance between the alert vehicle 10 and the ensuing vehicle 12). Moreover, the Vehicle Relative Distance may also account for any rail curvature or other deviation from a straight line by assessing GPS data to define the alert vehicle path along the rail to determine said curvature and apply it to any Vehicle Relative Distance calculation.

Figure 4:
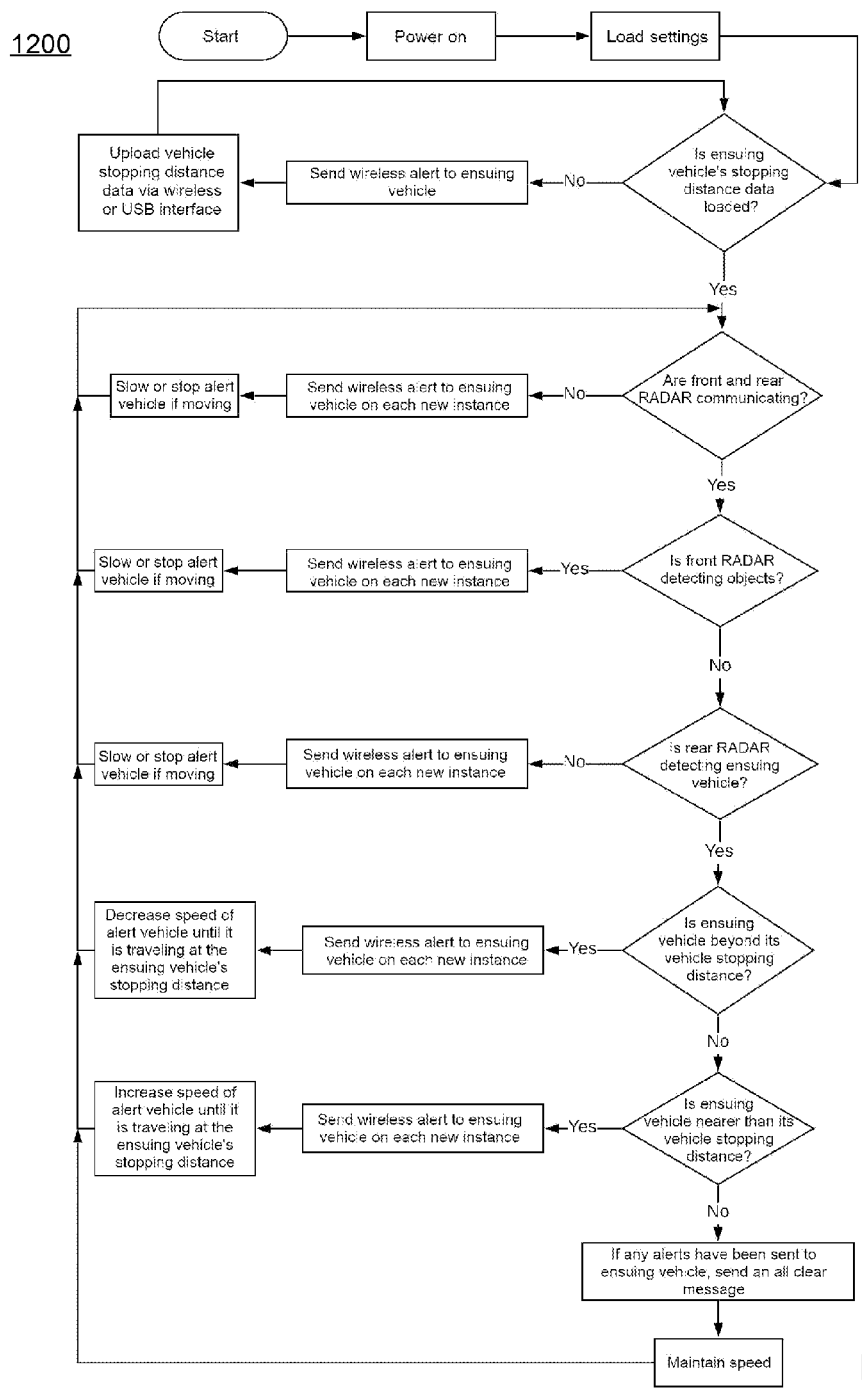
FIG. 4 illustrates a flow diagram to implement at least one alert vehicle process 1200 operating in the path disruption alert vehicle system disclosed herein.

The preferred alert vehicle process(es) 1200 is(are) implemented in software configured to operate the algorithm or flow diagram in FIG. 4. In addition to monitoring the path disruption events, the system also maintains a minimum distance from the ensuing vehicle 12 equal to the distance required for any given ensuing vehicle 12 to come to a stop (the "Stopping Distance") and in most instances not greater than about 200% of the Stopping Distance. Stopping Distance is preferably determined on a case-by-case based on variables related to the ensuing vehicle 12 and its environment. In preferred embodiments the Stopping Distance is determined based on at least the mass of the ensuing vehicle 12 and the instantaneous speed at which it the ensuing vehicle 12 is traveling, its initial velocity, final velocity, acceleration, distance traveled, train braking parameters, estimated rail friction, and track gradient and may also be based on or include adjustments for factors such as weight, or an empirically measured or estimated stopping distance for same or similar vehicle, the current condition of the road or track, and the current or predicted weather conditions at the current or future position(s) of the ensuring vehicle. Alternately, the Stopping Distance can be entirely empirically derived and selected from a table or a database as may be common in the art.

FIG. 4 includes a flow diagram showing a preferred process (or processes) executed by software operating on the processor 301 to implement the alert vehicle process 1200. Moreover, despite that the illustrated flow diagram shows the control system algorithm combined, the control system may be separated into two separate processes that operate independently from each other on the same or on separate processors 301.

Per FIG. 4, upon determination, input, or acquisition of the ensuing vehicle 12 Stopping Distance, the processor 301 uses the position determination output 262 from the position determination device 26 to determine the position of the path disruption alert vehicle 10 relative to the ensuing vehicle 12 and/or the distance there between ("Vehicle Relative Distance") and whether that distance is at least as great as the ensuing vehicle 12 Stopping Distance. If the processor 301 operating the vehicle speed control process determines the Vehicle Relative Distance is less than the Stopping Distance, the processor 301 will operate the motor control 124 to cause the path disruption alert vehicle 10 to increase its speed until the Vehicle Relative Distance is at least as much as the Stopping Distance. Additionally, it is desirable that the alert vehicle 10 not get too far forward of the ensuing vehicle 12. Accordingly, the vehicle speed control process may also operate or apply the alert vehicle brake system 126 if Vehicle Relative Distance exceeds a programmable upper limit, which may for example be an integer or non-integer multiple of the Stopping Distance.

Finally, preferred motor of the alert vehicle 10 is an electric motor and the power supply 21 comprises a battery. Further, it is preferred that the alert vehicle 10 include a first charging contact 25 oriented at the rearward portion of the alert vehicle 10 positioned to make charging-contact with a second charting contact located at or near the front of the ensuing vehicle 12 thereby allowing the alert vehicle 10 to charge while in contact with the ensuing vehicle 12 and take off forward of the ensuing vehicle 12 on the train track 11 on which the path disruption alert vehicle system is employed.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents

The invention claimed is:

1. A path disruption alert system for an ensuing vehicle, comprising:
 a path disruption alert vehicle comprised of a chassis, a motor control, a brake system, a path disruption sensor configured to sense disruptions in the forward path of the alert vehicle and produce a path disruption output, a position determination device with a position determination output, and a first wireless communications device, a processor operatively coupled to the motor control, the brake system, the path disruption output, and the position determination output, the processor operating at least one alert vehicle process to
  (i) detect path disruption alerts on the path disruption output and transmit said alert from the first wireless communications device, and
  (ii) operate the motor control and brake system to cause the alert vehicle to maintain a position forward of the ensuing vehicle that is at least as much as an ensuing vehicle stopping distance; and
 a second wireless communications device located at the ensuing vehicle and in wireless communication with the first wireless communications device to receive the path disruption alert.

2. The path disruption alert system in claim 1, wherein the ensuing vehicle stopping distance comprises a variable based on at least the ensuing vehicle mass and speed, which variable is accessed by the at least one alert vehicle process.

3. The path disruption alert system in claim 1, wherein the ensuing vehicle stopping distance is determined based on at least the following factors: the ensuing vehicle mass, its initial velocity, final velocity, acceleration, distance traveled, train braking parameters, estimated rail friction, and track gradient.

4. The path disruption alert system in claim 1, wherein the path disruption sensor comprises a radar device having an antenna oriented to emit radar waves towards the forward path of the path disruption alert vehicle.

5. The path disruption alert system in claim 1, wherein the path disruption sensor comprises a video camera and video processing system, the camera positioned with the camera lens oriented to capture video of the forward path of the path disruption alert vehicle.

6. The path disruption alert system in claim 1, wherein the position determination device comprises a radar device having an antenna oriented to emit radar waves towards the rearward path of the alert vehicle.

7. The path disruption alert system in claim 1, wherein the position determination device comprises a Global Positioning System receiver.

8. A path disruption alert vehicle for a rail mounted vehicle, comprising:
a path disruption sensor oriented to sense the forward path of the alert vehicle and detect rail mounted vehicle path disruptions and initiate a path disruption alert;
a position determination device configured to detect the rail mounted vehicle position;
a processor coupled to the path disruption sensor and the position determination device, the processor operating at least one software process to (i) receive the path disruption alert, and (ii) regulate the speed and distance of the alert vehicle to position the alert vehicle forward of the rail mounted vehicle position at a distance sufficient for the rail mounted vehicle to stop; and
a first wireless communications device coupled to the processor, the first wireless communications device transmits path disruption alert to the rail mounted vehicle;
wherein a second wireless communications device located at the rail mounted vehicle receives the path disruption alert, and
wherein the distance sufficient for the rail mounted vehicle to stop is programmed into the at least one process to regulate the speed and distance of the alert vehicle to position the alert vehicle.

9. The path disruption alert vehicle system in claim 8, wherein:
the path disruption sensor comprises a radar device having an antenna oriented to emit radar waves towards the forward path of the alert vehicle.

10. The path disruption alert vehicle system in claim 8, wherein
the path disruption sensor comprises a video camera and video processing system, the camera positioned with the camera lens oriented to capture video of the forward path of the alert vehicle.

11. The path disruption alert vehicle system in claim 8, wherein
the position determination device comprises a radar device having an antenna oriented to emit radar waves towards the rearward path of the alert vehicle.

12. The path disruption alert vehicle system in claim 8, wherein
the position determination device comprises a Global Positioning System receiver.

13. A method of operating a path disruption alert vehicle system, comprising:
propelling an alert vehicle forward from an ensuing vehicle,
sensing path disruptions forward of the alert vehicle with a path disruption sensor configured to sense a disruption in the forward path of the alert vehicle;
determining the relative positions of the alert vehicle and ensuring vehicle;
operating a software process to control an alert vehicle motor control and brake system to position the alert vehicle forward from the ensuring vehicle at sufficient distance to allow the ensuing vehicle to stop before reaching the disruption in the forward path of the alert vehicle; and
transmitting the sensed disruption in the forward path of the alert vehicle to the ensuing vehicle;
wherein the sufficient distance is a variable based on at least the ensuing vehicle mass and speed, which variable is accessed by the software process to control the alert vehicle motor control and brake system.

14. The method in claim 13, wherein:
sensing path disruptions comprises transmitting and receiving radar waves from and to a first radar device having an antenna oriented to emit radar waves towards the forward path of the alert vehicle.

15. The method in claim 13, wherein
sensing path disruptions comprises receiving video from a video camera to a video processing system, the camera positioned with the camera lens oriented to capture video of the forward path of the alert vehicle.

16. The method in claim 13, wherein
determining the position of the ensuring vehicle comprises transmitting and receiving radar waves from and to a second radar device having an antenna oriented to emit radar waves towards the rearward path of the alert vehicle.

17. The method in claim 13, wherein
determining the relative positions of the alert vehicle and ensuring vehicle comprises receiving positioning data from a first Global Positioning System receiver located at the alert vehicle and a second Global Positioning System receiver located at the ensuing vehicle.

* * * * *